Nov. 21, 1967 R. P. MUNDORFF ET AL 3,353,294
SELF-AFFIXING FISHING LINE FLOAT
Filed June 28, 1965 2 Sheets-Sheet 1

INVENTORS.
REWE P. MUNDORFF
DE ETTE A. BERRY

ATTORNEYS

Nov. 21, 1967 R. P. MUNDORFF ET AL 3,353,294
SELF-AFFIXING FISHING LINE FLOAT
Filed June 28, 1965 2 Sheets-Sheet 2

INVENTORS.
REWE P. MUNDORFF
DE ETTE A. BERRY

ATTORNEYS

United States Patent Office 3,353,294
Patented Nov. 21, 1967

3,353,294
SELF-AFFIXING FISHING LINE FLOAT
Rewe P. Mundorff, 2203 N. Franklin St., and De Ette A. Berry, 2209 N. Franklin St., both of Colorado Springs, Colo. 80907
Filed June 28, 1965, Ser. No. 467,255
15 Claims. (Cl. 43—44.91)

ABSTRACT OF THE DISCLOSURE

A fishing line float having separate upper and lower compartments, with a tubular passage extending centrally through the two compartments and a tapered section formed in the passage near the midpoint. A stem extends upwardly in the lower portion of the passage to lift a gravity actuated ball away from the tapered portion, to permit the line to pass downwardly through the passage until the stem drops, when the ball will drop by gravity to wedge the line and stop its descent. The lower end of the passage and also an opening in the side of the passage below the float permit a regulated amount of water to enter the lower compartment, in order to lift a small float which is within the lower compartment and slides upwardly and downwardly on the passage tube, to engage a pivoted link which extends into the passage tube to engage the pin. A slot in the passage tube through which the link extends also admits water into the lower compartment.

---

This invention relates to the art and practice of angling, and more particularly to the mode thereof which is featured by the presence of a float, frequently termed a bobber, attached to and for suspension of the submerged portion of a fishing line to provide a visible indication of attempts made to take the bait or lure, and particularly a float adapted to position the baited hook, or the related sinker weight, at a desired depth below the water surface.

Among the objects of this invention are to provide a novel and improved float distinguished by unique and advantageous coactability with a fishing line; to provide a novel and improved fishing line float which permits adjustment of the amount of the associated line below the float, in conditions of actual fishing use; to provide a novel and improved fishing line float which effects an automatic grip of the associated line in reaction to partial immersion of the float in the water; to provide a novel and improved fishing line float which is freely slidable in both directions along an associated line, when removed from the water, and is automatically effective to grip the line in reaction to partial immersion of the float; to provide a novel and improved fishing line float which is automatically effective to grip the line and prevent further drop of the line at a predetermined time after immersion of the float; to provide a novel and improved fishing line float which is automatically effective to grip the line against movement in one direction; to provide a novel and improved fishing line float employable in initial loose sliding association with an associated line to permit line shift in both directions through the float, when the float is initially placed in the water, followed by automatic inhibition of line shift in one direction therethrough, but accommodating such shift in an opposite direction; to provide a novel and improved fishing line float which may be used to determine and adjust the length of line suspended from the float, subsequent to placement of the float in the water; to provide a novel and improved construction and intercorrelation of elements constituting a fishing line float of the character described; to provide a novel and improved fishing line float of the character described which is economical in production, is simple, convenient, and practical in use, is positive and efficient in operation, and is durable throughout a protracted life of repetitious service.

With the foregoing and other objects in view, the invention resides in the construction, arrangement, and operative combination of features and elements as hereinafter set forth, pointed out in the appended claims, and illustrated by the accompanying drawings, in which:

Figure 1:
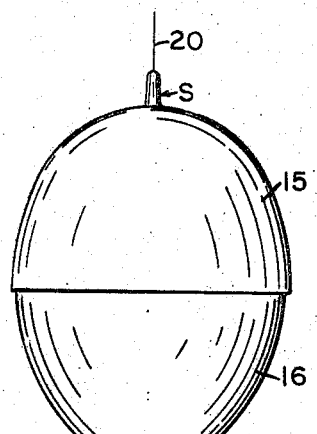
FIG. 1 is a side elevation of a typical embodiment of the invention, shown in association with a portion of a fishing line.

The technique of angling characterized by use of a float or bobber, attached to a fishing line carrying a baited hook or an equivalent lure, is so anciently known and universally practiced as to preclude occasion for elaboration. Adversely significant to such technique, however, has been the incapacity of existing equipment to accommodate variations and adjustments of float disposition along the associated line whereby, desirably, to correlate the length of submerged line and the depth of gear carried thereby, suspended from the float, with the water depth, basin floor, and other pertinent variables after the float is in place on the water. Thus, the instant invention is directed to the provision of a novel and improved float capable in association with a fishing line of normally automatic but optional manual adjustment along the line as applied to and positioned for actual use.

Formed in resemblance to conventional fishing line floats as a preferably ovoid unit having a longitudinally axial passage for the line, the present invention includes upper or air and lower or water chambers A and W, conjoined at a transverse diametric plane. Fabricated in any feasible manner from suitable material, preferably a synthetic resin or one of the so-called plastics, the outside of chambers A and W are, as illustrated, formed by thin walled, end rounded, half shells 15 and 16 registrable at their greater, open ends and there closed by a flat diaphragm 17, fixedly sealed thereto in any suitable manner, as by an adhesive, heat bonding, or the like, so that the upper chamber A will constitute an air chamber of adequate buoyant potential. The lower chamber W is empty prior to placement of the float in the water, but begins to fill as soon as the float is placed in the water, through a tubular column C which projects centrally from the lower end of the lower half shell 16 and extends upwardly into the upper chamber A. As the lower chamber fills, a buoyant member B, which conveniently surrounds column C, thereby utilizing the column as a guide for its movement, will rise from the lower position of FIG. 2 to the upper position of FIG. 3. In the lower portion of FIG. 2, the weight of buoyant member B holds a pivoted link L in a position such that the inner end of the link, which extends into column C, will maintain a pin P in an upper position, thus lifting a ball 18 off a downwardly tapered seat 19 formed in column C. The fishing line 20 extends through a sleeve S which projects upwardly from the upper shell 15 and is joined to column C within the upper chamber, as in a manner described below. As long as ball 18 is held off seat 19, line 20 is free to run downwardly through the float, as the weight on the line causes the line to descend. However, as the lower chamber W fills with water, buoyant member B will rise and link L will pivot, until pin P has lowered sufficiently to permit ball 18 to engage seat 19, as in FIG. 3, thereby wedging line 20 against the seat to prevent further descent of the line. Thus, at a time determined by the rate of flow of water into the lower chamber, the line will be wedged. The normal rate of flow is preferably determined by the size of a lateral hole 21 in the lower projecting end of column C, the size of which may be varied for different conditions, since lateral hole 21 is preferably larger than the lower end of a preferably downwardly tapering, central hole 22 in column C, through which line 20 extends. Thus, lateral hole 21 should be proportioned so that the line will descend, after the float enters the water, for a period of time, such as 5 to 10 seconds or more, that the bait or lure will reach the depth normally desired, the wedging of the line being automatic at the end of the period.

In the event that the depth to which the bait or lure is to sink is less than the normal depth, the angler may wait, less than the predetermined time, a number of seconds corresponding to the lesser depth desired, and hold the line, so that no more line will descend, until the line is automatically wedged. Or, the angler may wait until the line has descended to the normal depth provided by the above time period, then pull in on the line, which will dislodge ball 18, for a length which will move the bait or lure up to the desired depth, then release the line to permit the line to be automatically wedged by the ball. In the event a depth is desired greater than the normal provided by the above time period, the angler need only pull a length of line through the float, prior to casting, to equal the desired depth, when added to the normal depth. As will be evident, the action of the float of this invention not only automatically clamps the line at a predetermined time corresponding to a certain depth, but also permits the angler to adjust the depth in an easy and facile manner.

Figure 2:
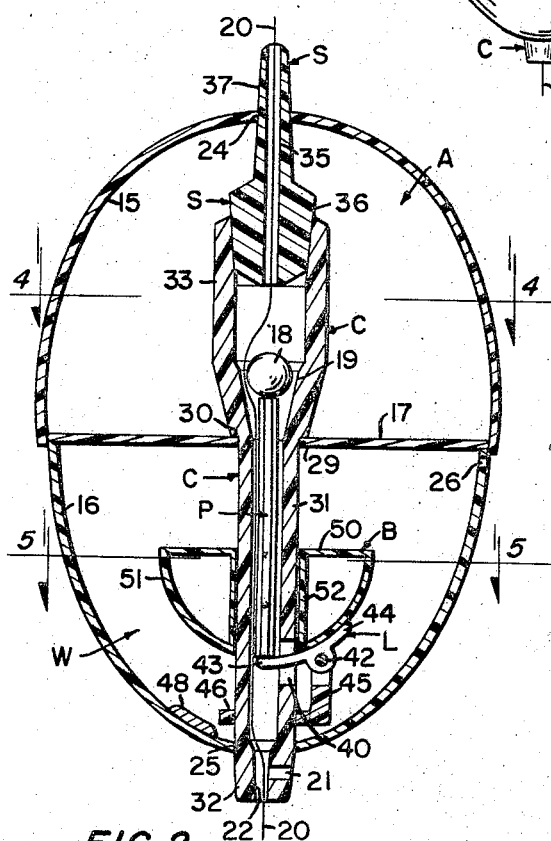
FIG. 2 is a longitudinal section, on an enlarged scale, taken substantially axially through the float of FIG. 1, with the interior elements thereof shown in a position to accommoadte a free shift of the associated line in both directions therethrough.
Figure 3:
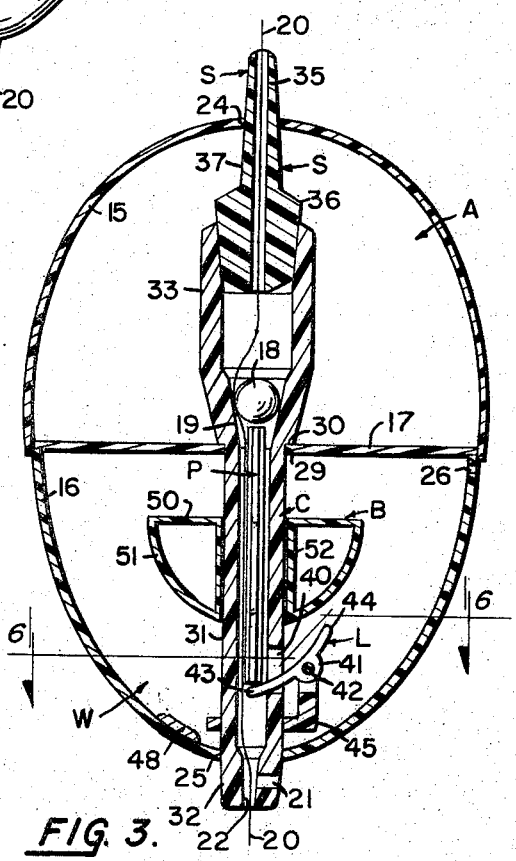
FIG. 3 is a longiudinal section similar to FIG. 2, but showing the interior elements as alternatively and automatically positioned to inhibit shift of the associated line in a downward direction therethrough.
Figure 4:
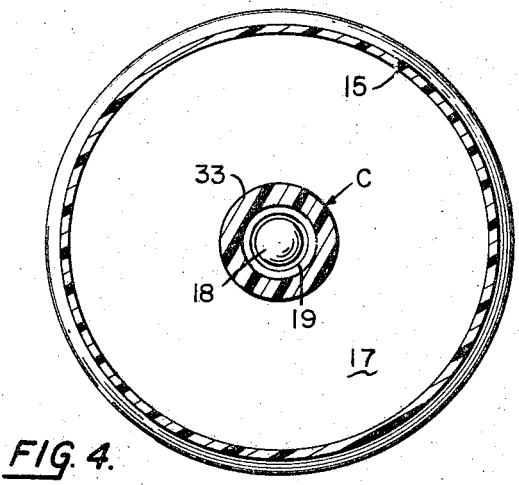
FIG. 4 is a lateral section taken along the indicated line 4—4 of FIG. 2, in the upper half of the float.

Final assembly of the unit, as shown, includes abutment of the open end of the half shell 16 against the periphery of the diaphragm 17 and overlapping of half shell 15 on half shell 16, to provide an adequate area for adhesive or other type of seal, to permanently interbond the mating ends of the half shells and the diaphragm, as in FIGS. 2 and 3.

In any expedient sequence, the interior, functionally distinctive components of the invention are organized in appropriate correlation with the half shells 15 and 16 and with the diaphragm 17, prior to the unit completing interassociations just discussed. Thus, the closed end of each half shell 15 and 16 is provided with a preferably circular hole 24 and 25, respectively, through which the sleeve S and column C extend, with the sleeve, particularly, being sealed to half shell 15 in any appropriate manner. Also, half shell 16 is provided with a small bleed hole 26 just below the upper end of the lower chamber, to permit air, displaced by water as the lower chamber fills, to bubble out through the bleed hole. The diaphragm 17 is formed with a central, circular hole 29 adapted to register in co-alignment with the openings 24 and 25 at the rounded ends of the half shells as finally assembled, with column C extending through such hole and sealed to the diaphragm, as at a shoulder 30 formed in column C just below seat 19. Susceptible of some variation in structural detail, the column C is, in the preferred form illustrated, an elongated unit having, below shoulder 30, a straight portion 31 of uniform diameter and thickness save for a slightly tapered lower end 32 adapted to be wedged into the hole in the end of half shell 16, and an enlarged socket 33 above seat 19 and tapering slightly upwardly. Tubular as specified, the column C is traversed by a through bore which varies in diameter, corresponding to the variations in outer diameter, except at the extreme lower end, and through which line 20 extends. Upper sleeve S is provided with a central bore 35 through which line 20 extends and which may be of uniform diameter throughout, and have a diameter corresponding to the lower end of the lower central hole 22 in column C. The lower portion of sleeve S is formed as a plug 36 which is tapered on the outside to correspond to and fit within socket 33, being connnected thereto to maintain the air in the upper chamber in half shell 15. The upper portion of sleeve S is formed as an oppositely tapered, smaller stem 37 which is receivable through and projects outwardly of the hole 24 in the rounded end of the half shell 15 in axial coalignment with the column C. As will be evident, bore 35 in sleeve S and the central bore of column C, establish, upon completion of the half shell, diaphragm, column and sleeve assembly, a straight, uninterrupted passage for the fishing line between the tip projection of the stem 37 and the end 32 of the column C, out of communication with the closed air chamber A developed interiorly of the half shell 15 as a result of the sealed coactions set forth.

Figure 6:
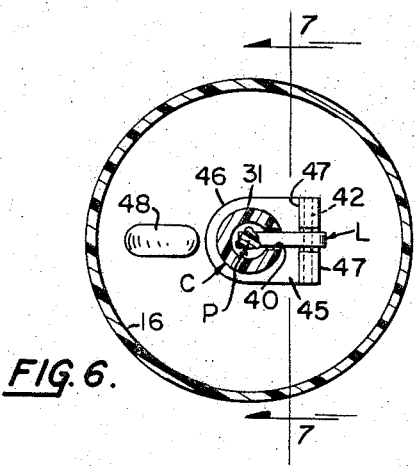
FIG. 6 is an offset lateral section taken along the indicated line 6—6 of FIG. 3, in the lower half of the float and below the section of FIG. 5.
Figure 7:
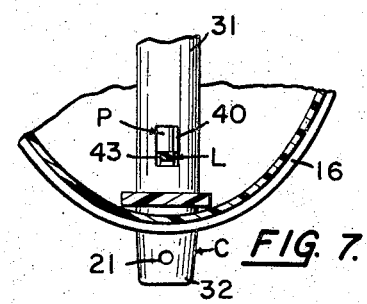
FIG. 7 is a fragmentary, detail section taken along the indicated line 7—7 of FIG. 6.

Spaced from the lower end of half shell 16, a longitudinally elongated slot 40 is provided in the wall of column C and performs a duel function, that of providing clearance for upward and downward movement of the inner end of link L and that of providing a passage for water to flow from within column C to the lower chamber in half shell 16. The area of slot 40, exclusive of that occupied by link L, should be greater than the total area of hole 21 and the maximum area of hole 22, so that the size of the latter can be varied to control the flow into the lower chamber. Link L may be provided with a central, depending boss 41 adapted to pivot about a transverse pin 42, as in FIGS. 2, 3 and 6, and oppositely extending, inner and outer ends 43 and 44 which are concave on the upper side. Between the lower end of half shell 16 and slot 40, an angular bracket 45 is mounted on column C by a ring 46, as in FIG. 6, and provides pivotal support for link L, through a pair of spaced ears 47, between which the link rocks and through which pin 42 extends. Ring 46 may be attached to column C by an adhesive, by heat sealing, or in any other suitable manner, while bracket 45 may be molded of plastic or die cast from a light weight metal. Obviously, an operative mounting of the link L may be accomplished in various other ways. However, structurally organized for intended operation, the link L is arranged to rock about and extend in both directions from a fixed axis to cause the inner end 43 of the link to move axially in column C, through the slot 40, for the purpose hereinabove described.

Since the unit is adapted to float on water with its longitudinal axis upright and the half shell 16 partially submerged, a weight 48 is desirably interiorly affixed to half shell 16 opposite link L, to counterbalance the axially offset unbalancing influence of the link L and its supporting bracket 45, to assure that the float will assume in use the intended axially upright position conducive to efficient operation of its movable elements. Counterweight 48 is conveniently formed of lead or other relatively heavy material, so that a small amount thereof will be sufficient.

Figure 5:
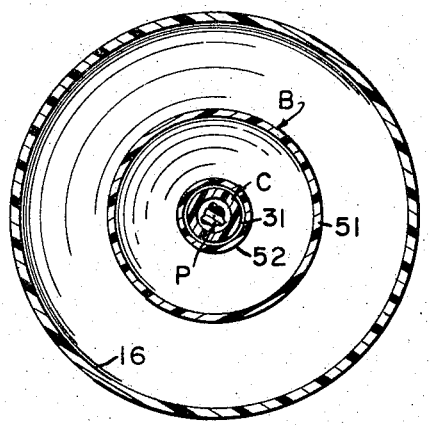
FIG. 5 is a lateral section taken along the indicated line 5—5 of FIG. 2, in the lower half of the float.

Freely reciprocable along and exteriorly about the column C, between the location of the link L and the underside of diaphragm 17, the buoyant member B, at the lower end of its travel, engages the outer end 44 and the central portion of the link, to cause pin P to raise ball 18, as explained previously, and by moving upwardly, to release the link, with a concomittant movement of pin P. In any appropriate size, form, and particular construction suited to its function of buoyant reaction to water, the buoyant member B feasibly may, as illustrated in FIGS. 2, 3 and 5, be a hollow, annular unit of hemispherical conformation defining a closed air chamber, such as formed by a planar top wall 50, a hemispherical lower wall 51 and an outer cylindrical wall 52 surrounding column C. Buoyant member B, as shown, may be molded in one piece or be formed of two or more pieces attached together by an adhesive, heat welding, or in any other suitable manner.

Figure 8:
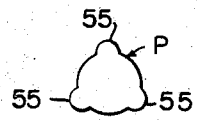
FIG. 8 is an end view, on a further enlarged scale, of a pin component shown in FIGS. 2, 3, 5 and 7.
Figure 9:
FIG. 9 is a similar end view of an alternative form of pin component.
Figure 10:
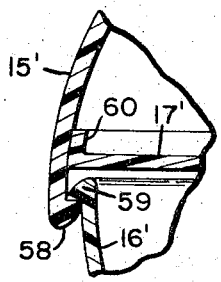
FIG. 10 is a fragmentary, detail section, on a further enlarged scale, illustrating a separable joint arrangement between the upper and lower halves of the float.
Figure 11:
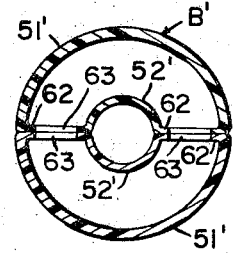
FIG. 11 is a lateral section, similar to a portion of FIG. 5 and taken transversely through a buoyant component, illustrating an alternative construction thereof.
Figure 12:
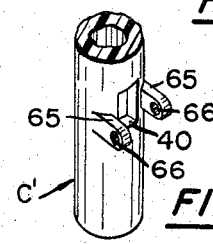
FIG. 12 is a fragmentary isometric view of the lower end of an alternative tubular column.

Pin P is longitudinally fluted to permit the line to move along it without interference, as by having a series of rounded ribs 55 extending in spaced relation, as in FIG. 8, or a series of wings 56, as in FIG. 9, forming a propeller shaped pin P'. As will be evident, the ribs 55 of FIG. 8 or the wings 56 of FIG. 9 will also guide the pin upwardly and downwardly in column C. Alternative constructions of other parts may also be utilized. For instance, the lower half shell may be removable, to permit inspection, adjustment or replacement of parts in the lower chamber, as by snap flanges 58 and 59 provided on the open ends of half shells 15' and 16', respectively. When such a snap joint is utilized, which need not produce a tight seal, since water will be filling the lower chamber in any event, diaphragm 17' may be provided with a peripheral flange 60, to provide greater area for an adhesive or for heat sealing. The buoyant member B' of FIG. 11 may be formed from two complementary, hollow, quadrispherical shells having planar top walls (not shown), bottom walls 51' and central cylindrical walls 52', each extending for 180°, rather than 360°, with a rib 62 extending across the inside of each half. Each rib 62 is provided with a slot 63 on each side, so that the halves may be more readily molded. Ribs 62 also provide a greater area for attaching the two halves together, as by an adhesive, heat sealing or in any other suitable manner. The support for link L may also be formed integrally with the column, as in FIG. 12, in which a pair of ears 65 are molded integrally with a column C', to extend outwardly in parallel relation from opposite sides of slot 40. Ears 65, as shown, are provided with holes 66 for reception of a pivot pin for the link, corresponding to pivot pin 42 of FIG. 2.

It will be understood, of course, that numerous other variations in construction of the parts may be utilized. Thus, since changes, variations, and modifications in the form, construction, and arrangement of the elements shown and described may be had without departing from the spirit of the invention, we wish to be understood as being limited solely by the scope of the appended claims, rather than by any details of the illustrative showing and foregoing description.

What is claimed is:
1. A fishing line float of the character described, comprising:
   a buoyant upper chamber;
   a water accessible lower chamber;
   a passage for freely slidable accommodation of a fishing line continuous through said upper and lower chambers;
   a buoyant member reactive to accumulation of water within said lower chamber;
   a movable stop within said passage gravity influenced to wedging coaction with the line therethrough;
   a lever rockably correlated with said buoyant member; and
   means for applying actuation of said lever to alternative wedging coaction and release of said stop.

2. A fishing line float as defined in claim 1, wherein the outer walls of said upper chamber and lower chamber conjunctively determine an ovoid body axially traversed by the line passage in an assembly suited to assume an axially upright attitude in engagement with a water surface.

3. A fishing line float as defined in claim 1, wherein said means for applying actuation of said lever comprises a pin in said passage reciprocably actuable by said lever.

4. A fishing line float as defined in claim 3, wherein said pin is longitudinally fluted.

5. A fishing line float as defined in claim 3, wherein:
   a wall of said upper chamber is a first half shell and a wall of said lower chamber is a second half shell conjunctively complementary to said first half shell;
   said line passage is formed by a multi-diameter, composite tubular member in sealed, coaxial relation with the walls of said upper chamber and coaxially traversing said lower chamber and having provision for water access therethrough to said lower chamber; and
   said stop means, lever and pin are structurally associated with said tubular member in an operative correlation responsive to the buoyant member.

6. A fishing line float as defined in claim 5, wherein:
   said composite tubular member has a varied bore conformation including a downwardly convergent throat;
   said buoyant member reciprocably embraces said tubular member within the lower chamber; and
   said stop is loosely received within, for coaction at appropriate times, with the convergent throat of the tubular member.

7. A fishing line float as defined in claim 6, wherein said composite tubular member includes:
   an upper sleeve having a stem projecting upwardly from the top of said first half shell and an enlarged plug within said upper chamber; and
   a column having at its upper end a socket for receiving said plug, said convergent throat being below said socket, a portion of substantially uniform diameter in said lower chamber and having a slot into which said lever extends for engagement with the lower end of said pin, and a downwardly tapered lower end extending from the lower end of said second half shell and provided with a lateral hole for inflow of water.

8. A fishing line float as defined in claim 1, wherein said upper and lower chambers are formed by generally hemispherical half shells disposed in opposed positions with a diaphragm therebetween.

9. A fishing line float as defined in claim 8, wherein said upper and lower half shells are detachably connected below said diaphragm.

10. A fishing line float as defined in claim 1, including a weight for counterbalancing said lever and mounted on the inside of said lower chamber opposite said lever.

11. A fishing line float as defined in claim 1, wherein:
   said buoyant member has a planar top wall, a semicylindrical lower wall and a cylindrical inner wall; and
   a column extends centrally through said lower chamber, provides said passage through said lower chamber and is surrounded by said inner wall of said buoyant member.

12. A fishing line float as defined in claim 1, wherein:
   a hollow column having a slot in one side thereof below said buoyant member extends generally centrally through said lower chamber; and
   a bracket for pivotally supporting said lever is mounted on said column below said slot and extends upwardly in spaced relation to said column.

13. A fishing line float as defined in claim 1, wherein:
- a hollow column having a slot therein below said buoyant member extends generally centrally through said lower chamber;
- a pair of ears extend outwardly from said column on opposite sides of said slot; and
- a pin for rockably supporting said lever extends between said ears.

14. A fishing line float of the character described, comprising:
- a buoyant upper portion;
- a water accessible lower portion;
- a passage for freely slidable accommodation of a fishing line continuous through said upper and lower portions;
- a gravity influenced, movable stop within said passage wedgingly coactable with the line extending therethrough;
- movable means engaging said stop and normally holding said stop upwardly and away from wedging position to permit said line to pass downwardly through said passage; and
- means reactive to accumulation of water in said lower portion for shifting said stop engaging means downwardly to cause said stop to wedgingly engage said line upon the accumulation of a predetermined amount of water in said lower portion.

15. A fishing line float as defined in claim 14, including:
- aperture means for controllably regulating the flow of water into said lower portion, whereby a predetermined time will elapse between the entry of said float into the water and the shifting of said stop by said reactive means, whereby a corresponding length of line will pass downwardly before said stop wedgingly engages said line.

References Cited

UNITED STATES PATENTS

| | | | |
|---|---|---|---|
| 2,221,437 | 11/1940 | Allison | 43—44.88 |
| 2,531,806 | 11/1950 | Coughlin | 43—44.91 |
| 2,669,054 | 2/1954 | Smith | 43—43.11 |
| 2,825,175 | 3/1958 | Skvier | 43—44.91 |
| 2,984,040 | 5/1961 | Fogaley | 43—43.11 |
| 3,201,892 | 8/1965 | Graham | 43—43.11 |

SAMUEL KOREN, *Primary Examiner.*

D. J. LEACH, *Assistant Examiner.*